(12) United States Patent
Gollob et al.

(10) Patent No.: US 9,142,987 B2
(45) Date of Patent: Sep. 22, 2015

(54) BATTERY MODULE WITH CONVERTER AND DECOUPLING SWITCH

(71) Applicant: Infineon Technologies Austria AG, Villach (AT)

(72) Inventors: Peter Gollob, Graz (AT); Werner Roessler, Neufahrn (DE); Andreas Pechlaner, Dietramszell (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 0 days.

(21) Appl. No.: 13/730,253

(22) Filed: Dec. 28, 2012

(65) Prior Publication Data

US 2013/0114309 A1 May 9, 2013

Related U.S. Application Data

(63) Continuation of application No. PCT/AT2011/000287, filed on Jun. 30, 2011.

(30) Foreign Application Priority Data

Jul. 2, 2010 (AT) .................................. A 1129/2010

(51) Int. Cl.
*H02M 3/335* (2006.01)
*H02J 7/00* (2006.01)
*B60L 11/18* (2006.01)

(52) U.S. Cl.
CPC ............ *H02J 7/0065* (2013.01); *B60L 11/1866* (2013.01); *H02J 7/0014* (2013.01); *H02M 3/33507* (2013.01); *Y02T 10/7005* (2013.01); *Y02T 10/7061* (2013.01); *Y02T 10/92* (2013.01)

(58) Field of Classification Search
USPC ......... 363/15, 16, 21.01, 21.04, 21.06, 21.12, 363/21.14
See application file for complete search history.

(56) References Cited

U.S. PATENT DOCUMENTS 5,821,729 A 10/1998 Schmidt et al.
6,388,424 B1 5/2002 Hidaka et al.
(Continued)

FOREIGN PATENT DOCUMENTS

| CN | 201438493 U | 4/2010 |
| DE | 44 22 409 A1 | 1/1996 |
| EP | 0 432 639 A2 | 6/1991 |

OTHER PUBLICATIONS

KutKut et al., Dynamic Equalization Techniques for Series Battery Stacks, 1996, IEEE, pp. 514-521.*
(Continued)

*Primary Examiner* — Jeffrey Gblende
(74) *Attorney, Agent, or Firm* — Slater & Matsil, L.L.P.

(57) ABSTRACT

A battery module and an arrangement including a number of battery modules connected in series are disclosed. An energy store has a positive and a negative connection. A boost converter has a first and a second converter output. The energy store is connected at the positive connection of the energy store to a first connection and at the negative connection of the energy store to a second connection. The first converter output is connected to a first compensation connection and the second converter output is connected to a second compensation connection. The converter is designed to draw energy from the energy store and to provide the energy to the converter outputs of the converter in the form of current.

18 Claims, 5 Drawing Sheets

(56) References Cited

U.S. PATENT DOCUMENTS

| | | | |
|---|---|---|---|
| 7,880,433 B2* | 2/2011 | Oh et al. | 320/118 |
| 2005/0017682 A1* | 1/2005 | Canter et al. | 320/118 |
| 2005/0127873 A1 | 6/2005 | Yamamoto et al. | |
| 2006/0028333 A1* | 2/2006 | Tyndall | 340/447 |
| 2006/0097698 A1* | 5/2006 | Plett | 320/118 |
| 2008/0079395 A1* | 4/2008 | Miyazaki et al. | 320/118 |
| 2009/0322155 A1* | 12/2009 | Oh et al. | 307/87 |
| 2010/0148726 A1* | 6/2010 | Lee et al. | 320/118 |

OTHER PUBLICATIONS

Kutkut, Nasser H., et al., "Dynamic Equalization Techniques for Series Battery Stacks," Telecommunications Energy Conference, 1996, INTELEC '96, 18th International, IEEE, pp. 514-521, Oct. 1996.

* cited by examiner

BATTERY MODULE WITH CONVERTER AND DECOUPLING SWITCH

This application is a continuation of International Application No. PCT/AT2011/000287, filed Jun. 30, 2011, which designated the United States and was not published in English, and which claims priority to Austrian Patent Application No. A 1129/2010, filed Jul. 2, 2010, both of which applications are incorporated herein by reference.

TECHNICAL FIELD

The invention relates to a battery module.

BACKGROUND

According to prior art there are known arrangements of battery modules wherein the battery modules each comprise an energy store. The battery modules are connected in series, and a predetermined current is applied to them by a charging device. In the course of the charging process the problem exists that the individual energy stores are charged differently due to the different ageing properties, and that an undesirable overcharging of individual energy stores can occur until the required charging voltage of the arrangement as a whole is reached.

To this end, in prior art there is proposed an arrangement with a number of energy stores, wherein the output voltage of each of the energy stores is carried to a control unit for controlling or driving a converter. When a predetermined maximum voltage, maximum charge, or maximum temperature for an energy store is exceeded, the control unit activates a converter the primary side of which is connected in parallel to the energy store. One of the two connections of the secondary side of the converter is connected with the system ground. The respective other connection of the secondary side of the converter is connected via a diode with the respective other connection of the charging device and the other pole of the energy store.

It is disadvantageous in prior art that for the energy discharge from the individual energy stores there are required two lines to a respective one of the two ends of the battery modules connected in series, respectively. There is required a large number of cables or wires as well as a large amount of work for their connection. In particular in the automotive sector, the routing of cable or wire harnesses is labor-intensive and cost-intensive. Moreover, the cables have a high mechanical stability and high-voltage strength. In mass production, the use of a plurality of cables is costly.

Proceeding from prior art, the objective task is to create a battery module which is easy to be cabled or wired and which manages with little external cabling or wiring and enables returning of the excess energy from the already charged battery modules.

SUMMARY OF THE INVENTION

The invention relates to a battery module comprising an energy store having a positive and a negative connection. The battery module comprises a first and a second connection, a first and a second compensation connection, a boost converter or step-up converter having a first and a second converter output, and a decoupling switch. The energy store is connected at the positive connection of the energy store to the first connection and at the negative connection of the energy store to the second connection. The first converter output is connected to the first compensation connection and the second converter output is connected to the second compensation connection, wherein the converter is designed to draw energy from the energy store and to provide the energy to the converter outputs of the converter in the form of current. The decoupling switch is connected at the first connection of the decoupling switch to the first compensation connection and at the second connection of the decoupling switch to the second compensation connection.

By this advantageous circuit or cabling, two adjacent battery modules can directly be wired up with each other so that only one cable routing, respectively, from the first battery module and from the last battery module of the battery modules located in the series to the charging voltage source is required. In comparison with prior art, thereby a considerable amount of required wires or cables is saved and the wiring or cabling is considerably simplified. Furthermore, the advantage results that the overall weight or the overall mass of the arrangement is reduced considerably and that the costs can be reduced drastically due to the reduced material requirements.

Advantageously, it can be provided that the converter is designed as a flyback converter. Thereby a particularly efficient energy transfer as well as a simple control or drive and controllability of the converter are enabled.

A further aspect of the invention provides that the converter is connected to the energy store. This simplifies the removal of the energy from the energy store to the remaining battery modules.

Furthermore, it can be provided that the converter comprises two converter inputs, one of which is connected to the positive connection of the energy store and the other one of which is connected to the negative connection of the energy store. This renders possible a particularly simple transfer of the energy stored in the energy store to the remaining battery modules.

Moreover, it can be provided that the converter comprises an output switch which, with one of its connections, is connected to one of the outputs of the converter. This enables a design of a barrier effect in such a way that an energy transfer is only possible from the energy store to the outputs of the converter, but not in the reversed direction.

Here it can be provided that the output switch is formed by a controlled electronic switch which is synchronized with the converter. The design facilitates a switchable energy transfer from the energy store to the outputs of the converter.

Preferably, it can be provided that the output switch is formed by an output diode, wherein the cathode of the output diode is connected to the first compensation connection or the anode of the output diode is connected to the second compensation connection. This renders possible a very simple and permanent barrier effect in such a way that energy can only be transferred from the energy store to the outputs of the converter.

Particularly advantageously it can be provided that the decoupling switch is formed by a diode the cathode of which is preferably connected to the first compensation connection. By the particularly simple design of the inventive circuit, a returning of the energy drawn from an overcharged energy store is possible in a simple manner and without any control or drive expenditure.

Alternatively or in combination therewith, it can be provided that the decoupling switch is formed by an electrically controllable switch which is synchronized with the converter. By the measure, the returning of the energy can be controlled in a simple manner.

Furthermore it can be provided that the converter is controlled by a control unit which monitors the operating state of the battery. This enables the carrying out of different charging and discharging methods.

In the course of this it can be furthermore provided that the control unit comprises a detector for detecting the voltage lying across the energy store, the present charge, or the temperature of the energy store, and also comprises a threshold value switch for activating the converter when a predetermined threshold value voltage, threshold value charge, or threshold value temperature is exceeded.

By the measures, an effective control or regulation of the charging or discharging method is enabled.

Furthermore, the invention relates to an arrangement comprising a plurality of inventive battery modules connected in series. Here it is provided that the first connection of the battery modules is connected to the second connection of the respectively following battery module and that the first compensation connection of the battery modules is connected to the second compensation connection of the respectively following battery module, wherein the first and second connections and compensation connections of the battery modules lying at the end of the series connection form connections of the arrangement.

It is particularly advantageous that the cable routing is extremely simple and that the battery modules are connected to each other by simple cable connections. Two adjacent battery modules only require two connection cables the length of which corresponds to the distance between the battery modules. Alternatively, the battery modules can also be plugged into each other or can be clamped together. This results in the advantage that, due to the low number of used cables or wires, cable or wire harnesses can be omitted and the overall weight or the overall mass of the arrangement can be enormously reduced, and that the costs can be drastically reduced due to the reduced material requirements.

Particularly advantageously it can be provided that the first connection lying at the end of the series connection and the first compensation connection lying at the end of the series connection are connected with each other, possibly via an electrically conductive first connection element, and that the second connection lying at the end of the series connection and the second compensation connection lying at the end of the series connection are connected with each other, possibly via an electrically conductive second connection element. This enables a particularly effective returning of the energy discharged by the energy stores to the entirety of the battery modules connected in series.

A further preferred aspect of the invention provides that the control units of the battery modules are connected with each other, possibly via a bus. Thereby the individual control units can exchange their charging state and, if necessary, they can transmit it to an external charge regulating unit. In this connection there exists the possibility to connect a charge state display to the bus which displays the state of charge of the individual batteries during a charging or discharging process.

Finally, the invention provides preferably that the control units are connected with a charge regulating unit, wherein the charge regulating unit comprises:

means for communication with the individual control units, in particular via a bus means for detecting and evaluating the temperature values, voltage values, and charge values determined with the individual control units means for controlling or driving the individual control units as well as for controlling or driving the converters, and means for carrying out a charge equalization method, wherein the converters are controlled or driven and, if necessary, activated on the basis of the determined temperature values, voltage values, and charge values.

By the preferred arrangement there can be performed different charging or discharging methods, as for instance during the balancing method, in a simple manner.

Particularly advantageously, the invention can be employed as a starter battery or an energy store in an automobile.

Battery modules according to the invention are industrially applied and manufactured in particular in the field of the not grid-connected energy supply.

BRIEF DESCRIPTION OF THE DRAWINGS

One embodiment of the invention will be represented in a non-limiting manner by means of the following figures, wherein.

DETAILED DESCRIPTION OF ILLUSTRATIVE EMBODIMENTS

Figure 1:
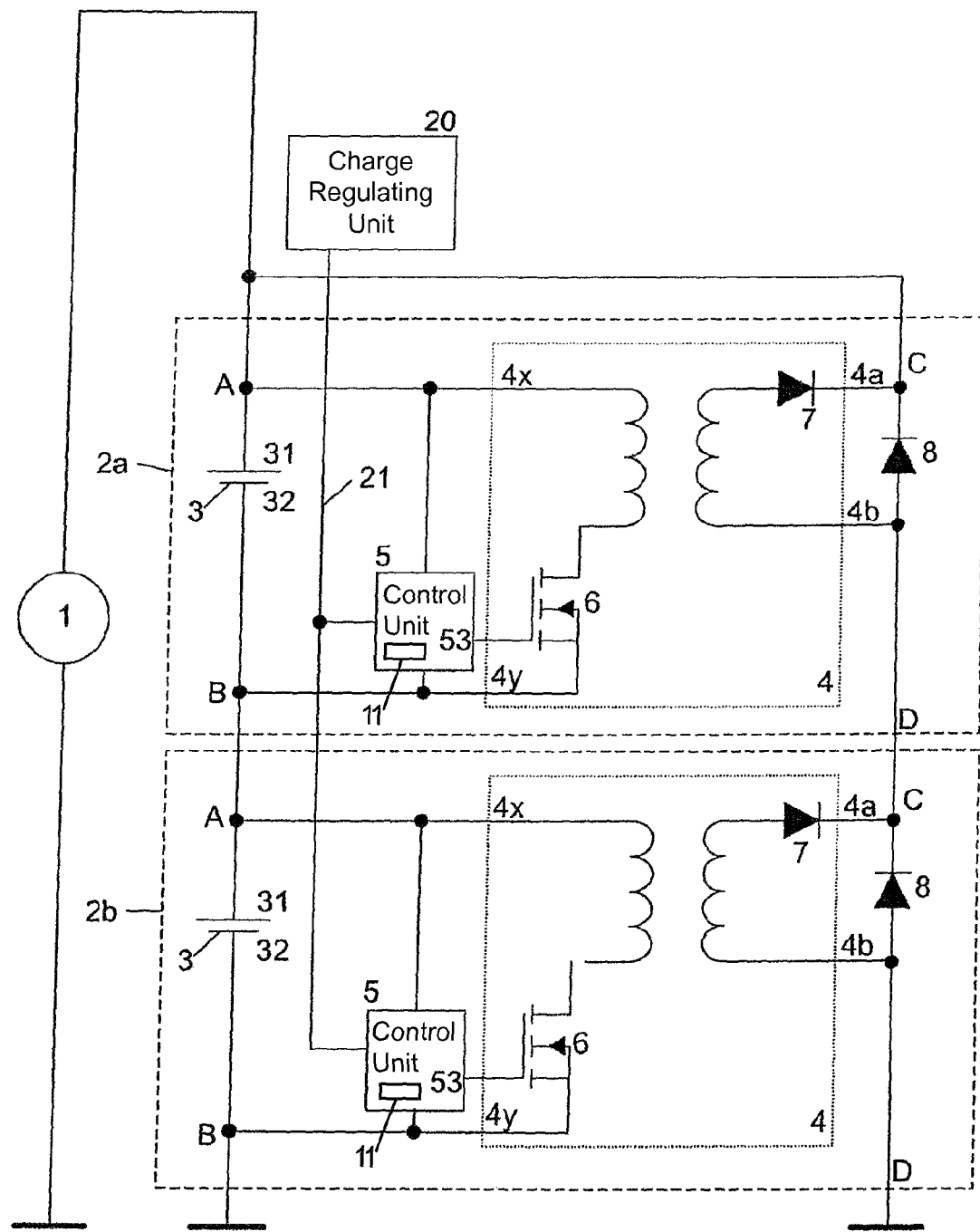
FIG. 1 shows an inventive circuit with a charging unit.

In FIG. 1 there is depicted an embodiment of the invention. The circuit comprises two battery modules 2a, 2b which are connected to a charging voltage source 1. Each of the battery modules 2a, 2b comprises an energy store 3, for instance in the form of an accumulator, a battery, or a capacitor, etc. Each of the battery modules 2a, 2b comprises a first connection A and a second connection B. Furthermore, each of the battery modules 2a, 2b comprises a first compensation connection C as well as a second compensation connection D. The energy store 3 is connected at the positive connection 31 of the energy store 3 to the first connection A and at the negative connection 32 of the energy store 3 to the second connection B. Each of the ends of the series connection of the energy stores 3 will be connected to one of the poles of the charging voltage source 1, respectively, or to one connection of a consumer load, respectively. In doing so, by the charging voltage source 1 the voltage and the polarity required for charging the battery modules 2a, 2b are set and a predetermined charging current is impressed. On connection of a consumer load, a discharge current appears. In the following embodiment, the energy stores 3 are represented as double-pole energy stores 3.

Each battery module 2a, 2b further comprises a boost converter 4 which, for example, can be designed as a flyback converter. At the secondary side of the converter 4 there are provided a first converter output 4a and a second converter output 4b. The first converter output 4a is connected to the first compensation connection C, the second converter output 4b is connected to the second compensation connection D. In the present case, the converter 4 is designed to draw energy from the energy store 3 and to provide the energy to the converter outputs 4a, 4b of the converter 4 in the form of current. The converter 4 is connected to an energy store 3, wherein the converter 4 has two converter inputs 4x, 4y, one of which is connected to the positive connection 31 of the energy store 3 and the other one of which is connected to the negative connection 32 of the energy store 3. The converter 4 further comprises a control input via which the transmission behavior of the converter 4 can be set. In the represented preferred embodiment of the invention, the converter 4 comprises a control switch 6 connected to the control input of the converter 4, the control switch 6 effecting an interruption of the primary side of the converter 4. When the control switch is for instance controlled in a clocked manner, energy from the energy store 3 is transferred to the outputs of the converter.

Each battery module 2a, 2b further comprises a decoupling switch 8. The decoupling switch 8 is connected at the first connection of the decoupling switch 8 to the first compensation connection C and at the second connection of the decoupling switch 8 to the second compensation connection D. Advantageously, the decoupling switch 8 is formed by a diode the cathode of which is preferably connected to the first compensation connection C. Alternatively, however, it can also be provided that the decoupling switch 8 is formed by an electrically controllable switch which is synchronized with the converter 4.

In particular in the present embodiment it is provided that the converter 4 comprises an output switch 7. With one of its connections, the output switch 7 is connected to one of the outputs 4a of the converter 4. The output switch 7 is formed by an output diode the cathode of which is connected to the first compensation connection C. Alternatively, it can also be provided that the anode of the compensation diode is connected to the second output connection D. The output switch 7 can also be formed by an electronic switch which is synchronized with the converter. The respective other connection of the output switch 7 is connected in an electrically conductive manner either with the first compensation connection C or with the second compensation connection D.

Furthermore, each battery module 2a, 2b comprises a control unit 5 which comprises two measuring lines (not shown) which are connected with one of the electrodes of the energy store 3 of the respective battery module 2a, 2b, respectively. The control unit can be connected with or to a temperature probe arranged at the energy store of the respective battery module 2a, 2b or with or to a current meter connected in series with the energy store 3. Via the inputs, the voltage lying across the two electrodes of the energy store 3 can be tapped off by the control unit 5 and can be used for regulating the charging process. In some embodiments, control unit 5 includes detector 11 that is configured to detect a voltage lying across the energy store, a present charge or a temperature of the energy store. Detector 11 includes a threshold value switch configured to activate the converter when a predetermined threshold value voltage, threshold value charge, or threshold value temperature is exceeded. The control unit 5 is connected with the control input of the converter 4 via a control output 53 and, thus, regulates the switching behavior of the control switch 6 and, thus, the energy transmission between the energy store 3 and the converter 4.

The battery modules 2a, 2b are connected in series. The first connection A of the battery modules is connected to the second connection B of the respectively following battery module. The first compensation connection C of the battery modules is connected to the second compensation connection D of the respectively following battery module. The first and second connections A, B and compensation connections C, D of the battery modules lying at the end of the series connection form the connections of the arrangement, respectively. The first connection A lying at the end of the series connection and the first compensation connection C lying at the end of the series connection are connected with each other via an electrically conductive connection element. The second connection B lying at the end of the series connection and the second compensation connection D lying at the end of the series connection are connected with each other via a further, second conductive connection element.

All control units 5 of the battery modules 2a, 2b are in data connection with each other as well as with an external charge regulating unit 20 via a data line 21, in particular a bus.

The charge regulating unit 20 advantageously comprises the following components:

means for communication with the individual control units, in particular via a bus. The means can be different drivers and protocol components for the use of different bus protocols;

means for detecting and evaluating the temperature values, voltage values, and charge values determined with the individual control units 5. The means are receiving units which determine and provide the respective temperature values, voltage values, and charge values of the individual battery modules from the signals transmitted via the bus;

means for controlling or driving the individual control units as well as for controlling or driving the converter. The means are in particular transmitting units which deliver control signals onto the bus which are received by the control units 5. The control units 5 control or drive their converters 4 correspondingly; and means for carrying out a charge equalization method, wherein the converters are controlled or driven and, if necessary, activated on the basis of the determined temperature values, voltage values, and charge values. Such charging methods belong to the prior art and are known to the person having skill in this art for instance from Dynamic Equalization Techniques for Series Battery Stacks—Telecommunications Energy Conference, INTELEC Conf. Proceedings, pp. 514-521, 1996.

If necessary, the charge regulating unit 20 can also be omitted, and the charge regulation can be carried out locally via the individual control units 5.

Figure 2:
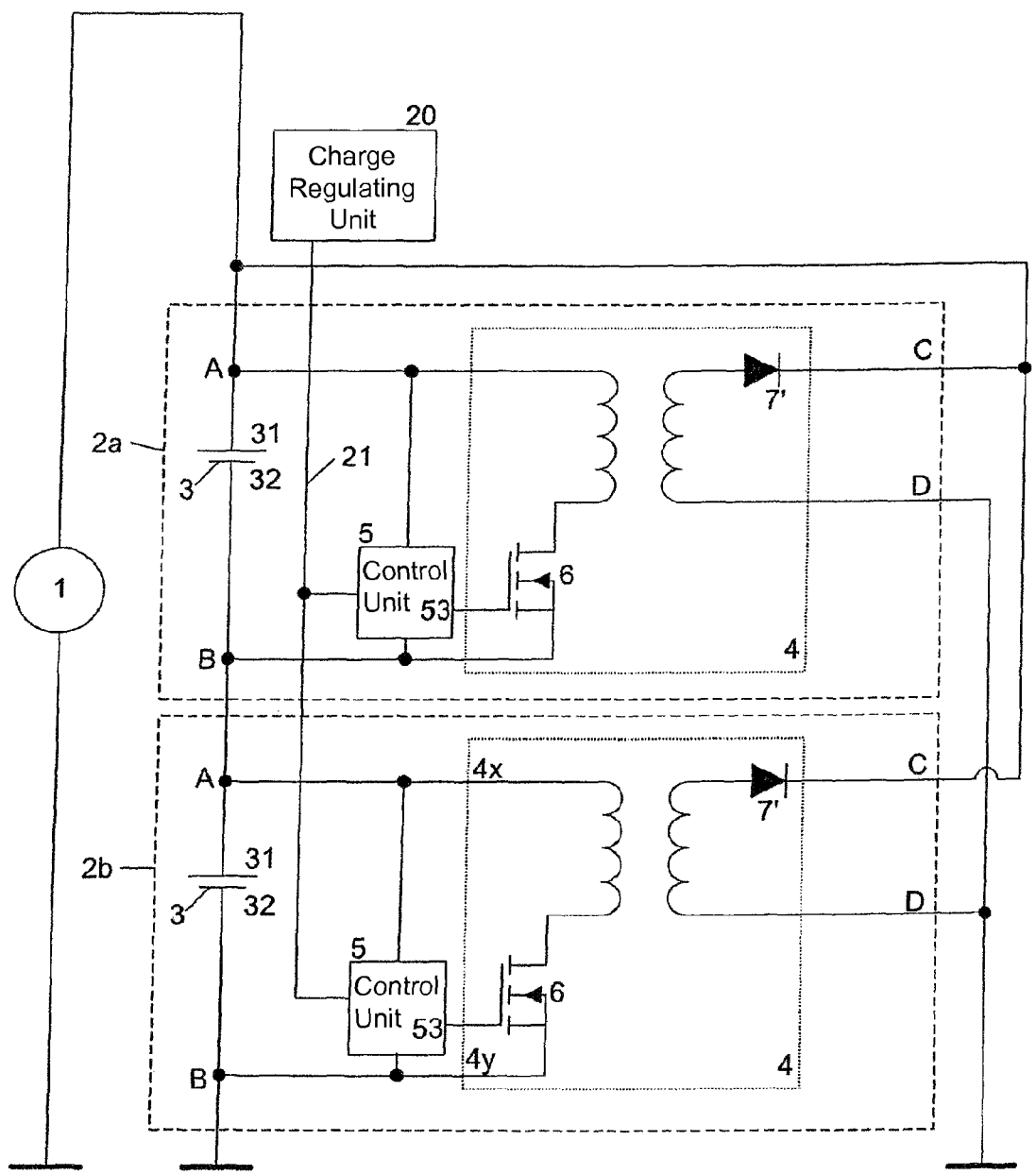
FIG. 2 shows a circuit according to prior art.

The circuit according to prior art which is depicted in FIG. 2 is described by means of the differences to the embodiment of the invention as represented in FIG. 1. The circuit comprises a charging voltage source 1 as well as a number of battery modules 2a', 2b', the energy stores 3 of which are connected in series.

The essential difference between the two circuits is the cabling of the secondary side of the converter 4. It is only provided a single diode 7' which, with its anode, is connected to an output of the secondary side of the converter 4. The cathodes of the diodes 7' of the individual battery modules 2a, 2b are connected with the positive pole of the charging voltage source 1, respectively. The respective other outputs of the secondary side 4b of the converters 4 are connected with the negative pole of the charging voltage source 1. Thus, a bus line is required which has to be routed to each of the battery modules.

Figure 3:
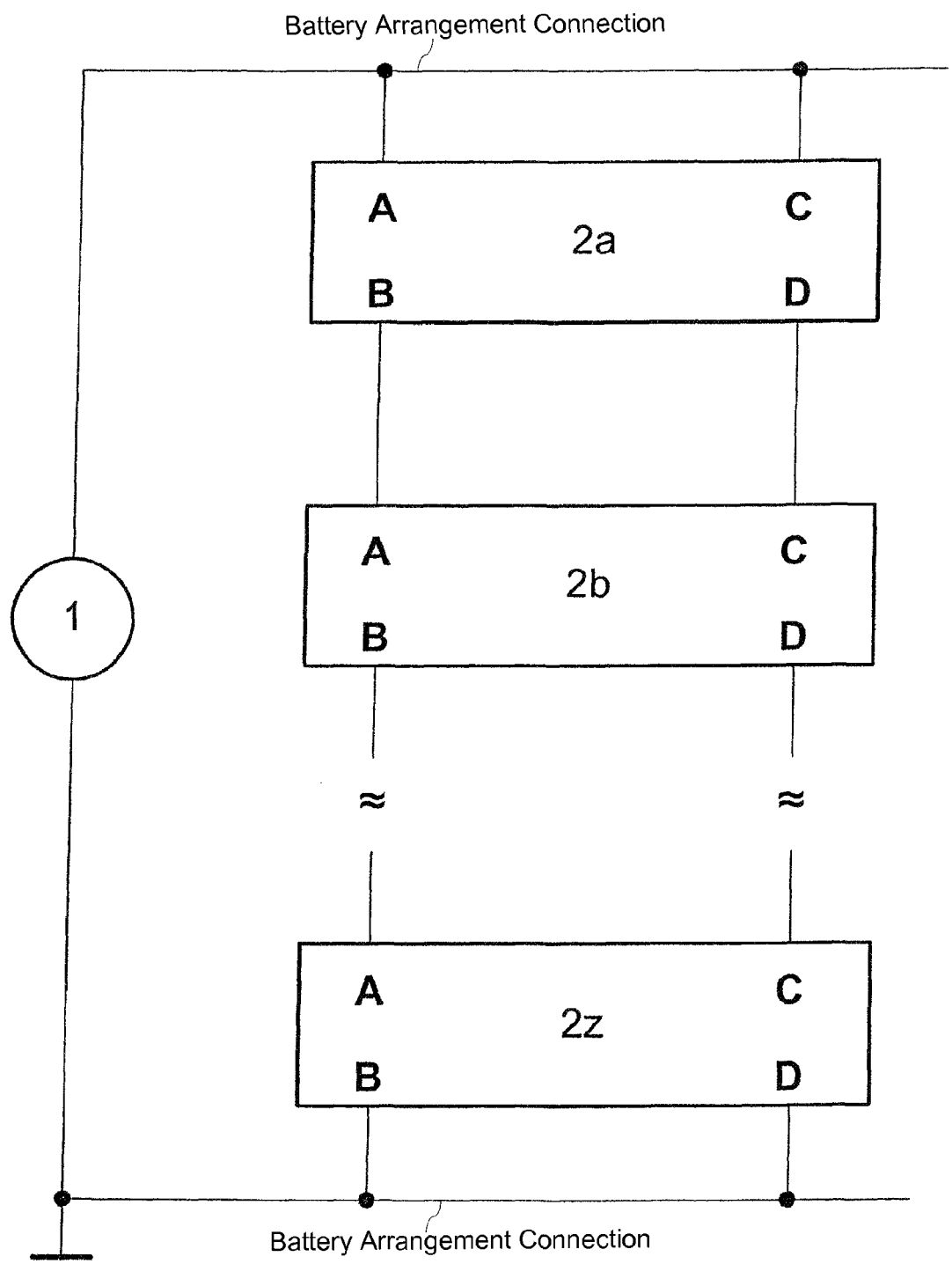
FIG. 3 shows the external cabling of the circuit of FIG. 1.
Figure 4:
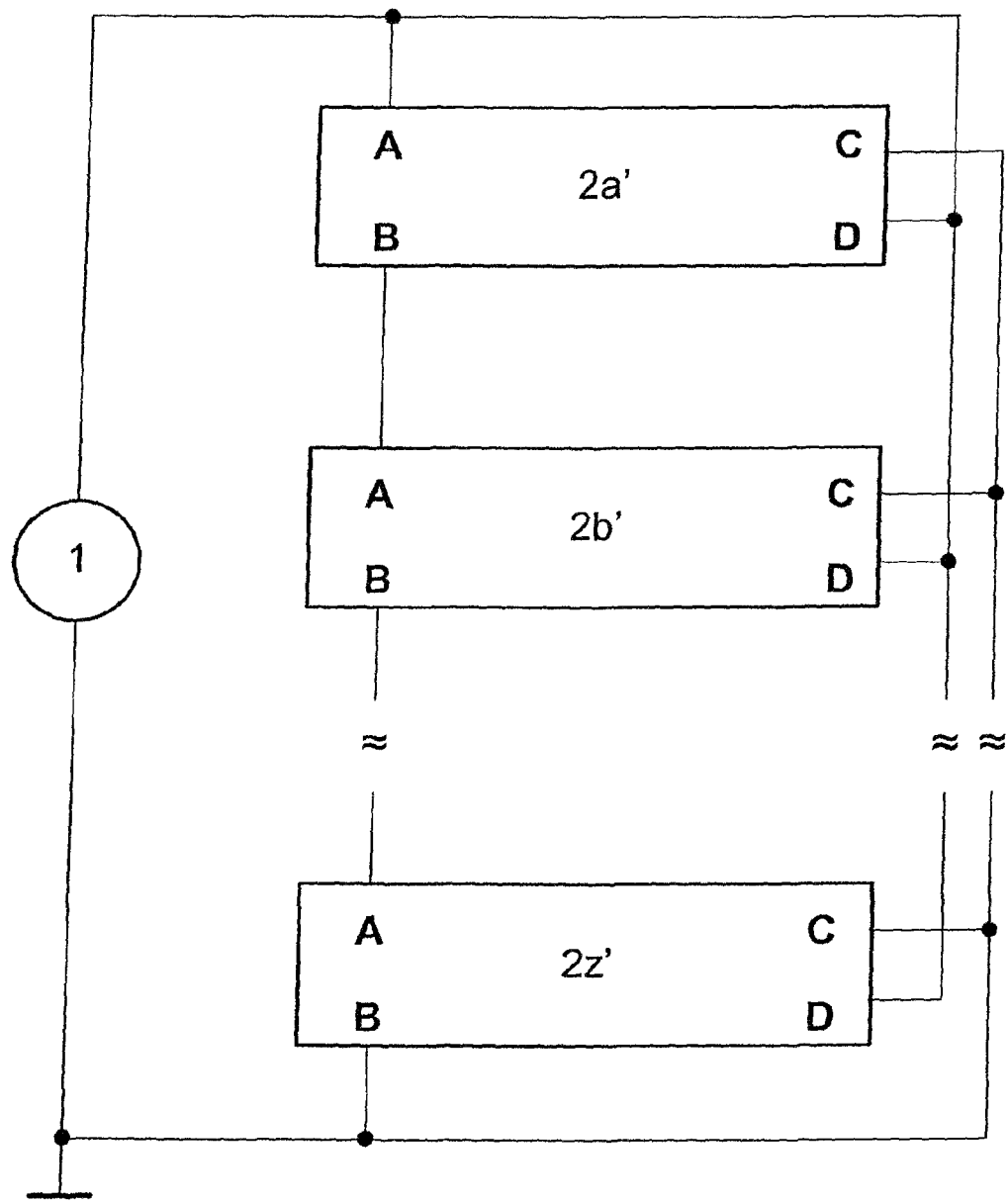
FIG. 4 shows the external cabling of the circuit of FIG. 2.

In FIG. 4 there is shown a modular circuit analogously to FIG. 3. It can be seen that the cabling of the individual modules is much more complex and that considerably more cables or wires are required.

Figure 5A:
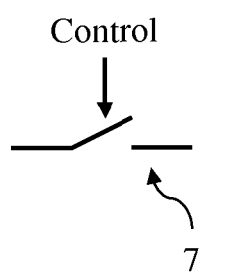
FIGS. 5a and 5b show circuit elements according to an embodiment.
Figure 5B:
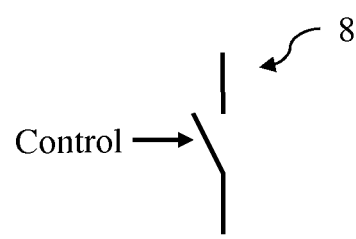

FIGS. 5a and 5b show circuit elements according to an embodiment. FIG. 5a illustrates output switch 7 as described in reference to FIG. 1 implemented as a controlled electronic switch that is synchronized with the converter. FIG. 5b illustrates decoupling switch 8 as described in reference to FIG. 1 implemented as an electrically controllable switch that is synchronized with the converter.

What is claimed is:

1. A battery module comprising:
a first connection;
a second connection;
an energy store having a positive connection and a negative connection, wherein the positive connection of the energy store is connected to the first connection and the negative connection of the energy store is connected to the second connection;
a first compensation connection directly connected to the positive connection of the energy store;
a second compensation connection;
a boost converter having a first converter output and a second converter output, wherein the first converter output is coupled to the first compensation connection and the second converter output is coupled to the second compensation connection, wherein the converter is configured to draw energy from the energy store and to provide the energy to the first and second converter outputs in the form of current;
a decoupling switch having a first connection directly connected to the first compensation connection that is directly connected to the positive connection of the energy store and having a second connection coupled to the second compensation connection; and
wherein the battery module is configured to be coupled in series with a plurality of battery modules, each battery module of the plurality of battery modules comprising a decoupling switch directly connected to at least one decoupling switch of an immediately adjacent battery module of the plurality of battery modules, and wherein the decoupling switches of each battery module are configured to form a directly connected series conduction path from a reference voltage node to the first connection.

2. The battery module according to claim 1, wherein the converter comprises a flyback converter.

3. The battery module according to claim 1, wherein the converter is coupled to the energy store.

4. The battery module according to claim 1, wherein the converter comprises a first converter input coupled to the positive connection of the energy store and a second converter input coupled to the negative connection of the energy store.

5. The battery module according to claim 1, wherein the converter comprises an output switch connected to one of the outputs of the converter.

6. The battery module according to claim 5, wherein the output switch is formed by a controlled electronic switch that is synchronized with the converter.

7. The battery module according to claim 5, wherein the output switch is formed by an output diode, wherein a cathode of the output diode is connected to the first compensation connection and an anode of the output diode is connected to the first converter output.

8. The battery module according to claim 1, wherein the decoupling switch is formed by a diode that includes a cathode directly connected to the first compensation connection and an anode coupled to the second compensation connection.

9. The battery module according to claim 1, wherein the decoupling switch is formed by an electrically controllable switch that is directly connected to the first compensation connection and is synchronized with the converter.

10. The battery module according to claim 1, wherein the converter is controlled by a control unit that monitors an operating state of the battery.

11. The battery module according to claim 10, wherein the control unit comprises a detector configured to detect a voltage lying across the energy store, a present charge or a temperature of the energy store, the detector comprising a threshold value switch configured to activate the converter when a predetermined threshold value voltage, threshold value charge, or threshold value temperature is exceeded.

12. A series connected battery arrangement comprising:
a plurality of battery modules, each battery module comprising:
a first connection,
a second connection,
an energy store having a positive connection and a negative connection, wherein the positive connection of the energy store is connected to the first connection and the negative connection of the energy store is connected to the second connection,
a first compensation connection,
a second compensation connection,
a boost converter having a first converter output and a second converter output, wherein the first converter output is coupled to the first compensation connection and the second converter output is coupled to the second compensation connection, wherein the converter is configured to draw energy from the energy store and to provide the energy to the first and second converter outputs in the form of current, and
a decoupling switch having a first connection coupled to the first compensation connection and a second connection coupled to the second compensation connection;
a first battery arrangement connection; and
a second battery arrangement connection, and
wherein the plurality of battery modules are coupled in series between the first battery arrangement connection and the second battery arrangement connection,
wherein the first connection and the first compensation connection of a first end battery module of the plurality of battery modules are connected to the first battery arrangement connection,
wherein the first connection of each battery module, excluding the first end battery module, is connected to the second connection of an adjacent battery module,
wherein the first compensation connection of each battery module, excluding the first end battery module, is connected to the second compensation connection of the adjacent battery module,
wherein the second connection of a second end battery module of the plurality of battery modules is connected to the second battery arrangement connection, and
wherein the first connection of each decoupling switch of each battery module, excluding the first connection of the decoupling switch of the first end battery module, is directly connected to the second connection of the decoupling switch of one of the adjacent battery modules.

13. The series connected battery arrangement of claim 12, wherein
the first battery arrangement connection is connected to the first connection of the first end battery module and to the first compensation connection of the first end battery module via an electrically conductive first connection element, and the second battery arrangement connection is connected to the second connection of the second end battery module via an electrically conductive second connection element.

14. The series connected battery arrangement of claim 12, wherein each battery module of the plurality of battery modules comprises a control unit and each control unit is connected with the control unit of the adjacent battery module of the plurality of battery modules.

15. The series connected battery arrangement of claim 14, wherein each control unit is connected via a bus.

16. The series connected battery arrangement of claim 14, wherein each control unit is connected with a charge regulating unit.

17. The series connected battery arrangement of claim 16, wherein the charge regulating unit is configured to
- communicate with each control unit;
- detect and evaluate temperature values, voltage values, and charge values determined with each control unit;
- control or drive each control unit and each converter; and
- carry out a charge equalization method, wherein each converter is controlled or driven and activated, if necessary, based on the determined temperature values, voltage values, and charge values.

18. An arrangement comprising:
a first battery module comprising:
- a first connection;
- a second connection;
- an energy store having a positive connection and a negative connection, wherein the positive connection of the energy store is connected to the first connection and the negative connection of the energy store is connected to the second connection;
- a first compensation connection;
- a second compensation connection;
- a boost converter having a first converter output and a second converter output, wherein the first converter output of the boost converter is coupled to the first compensation connection and the second converter output of the boost converter is coupled to the second compensation connection, wherein the boost converter is configured to draw energy from the energy store and to provide the energy to the first and second converter outputs of the boost converter in the form of current; and
- a decoupling switch having a first connection directly connected to the first compensation connection and a second connection directly connected to the second compensation connection; and a second battery module coupled in series with the first battery module, the second battery module comprising:
- a third connection;
- a fourth connection;
- a second energy store having a positive connection and a negative connection, wherein the positive connection of the second energy store is connected to the third connection and the negative connection of the second energy store is connected to the fourth connection;
- a third compensation connection;
- a fourth compensation connection;
- a second boost converter having a first converter output and a second converter output, wherein the first converter output of the second boost converter is coupled to the third compensation connection and the second converter output of the second boost converter is coupled to the fourth compensation connection, wherein the second boost converter is configured to draw energy from the second energy store and to provide the energy to the second boost converter outputs in the form of current; and
- a second decoupling switch having a first connection directly connected to the third compensation connection and a second connection directly connected to the fourth compensation connection, wherein the first connection of the first battery module is directly connected to the fourth connection of the second battery module, and the first compensation connection of the first battery module and the first connection of the decoupling switch are directly connected to the fourth compensation connection of the second battery module and the second connection of the second decoupling switch.

* * * * *